Apr. 24, 1923.
J. T. BISHOP
AUTOMOBILE TESTING APPARATUS
Filed Dec. 27, 1920
1,452,783
3 Sheets-Sheet 1
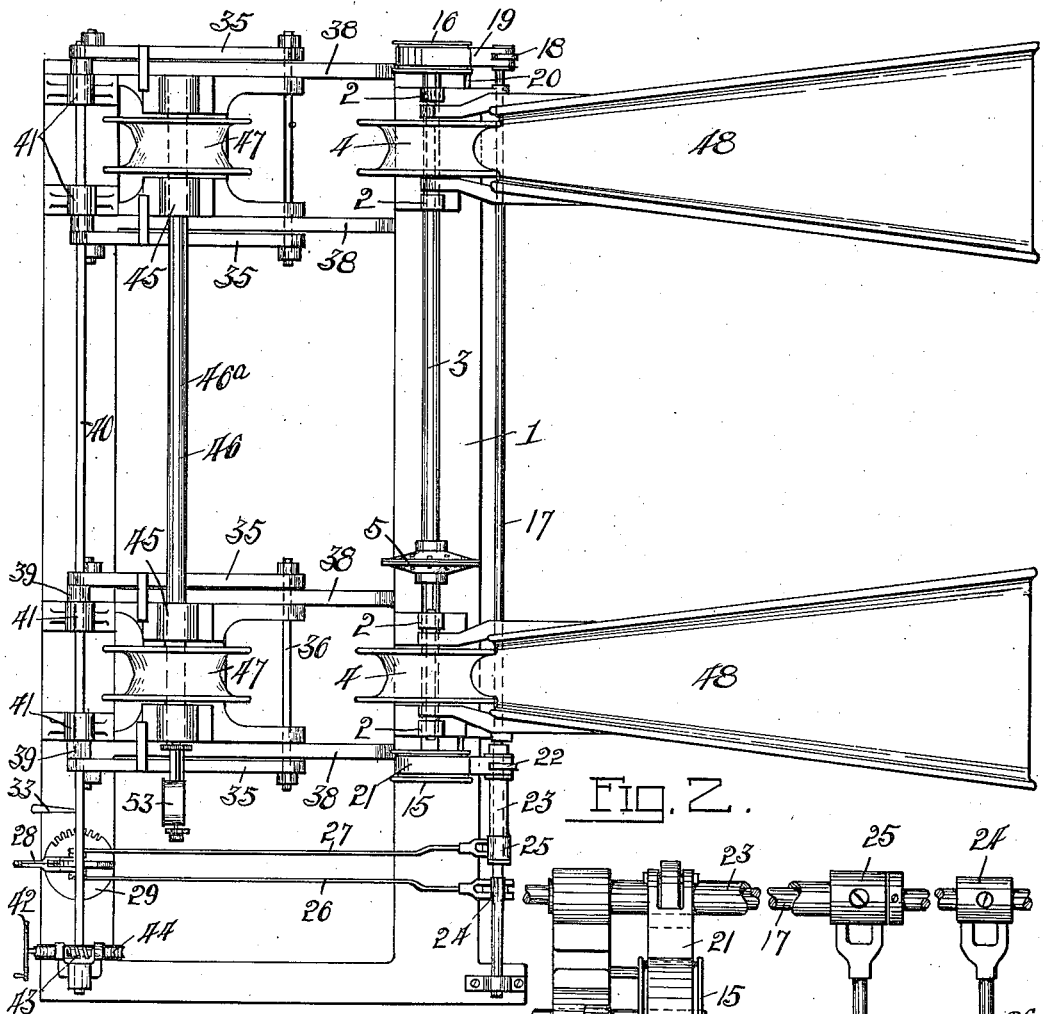
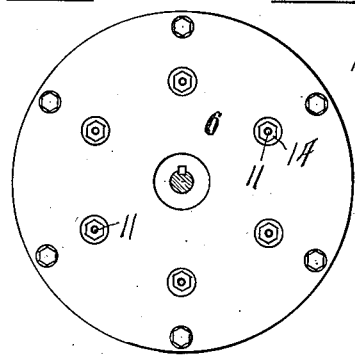
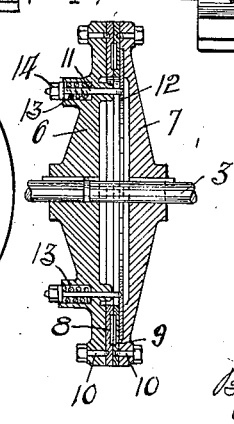
INVENTOR
Joseph T. Bishop,
By Owen Owen & Crampton,
His attys.

Apr. 24, 1923.
J. T. BISHOP
1,452,783
AUTOMOBILE TESTING APPARATUS
Filed Dec. 27, 1920
3 Sheets-Sheet 2
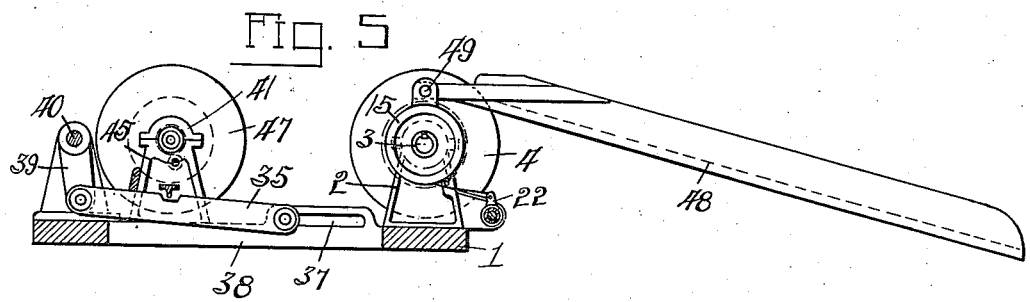
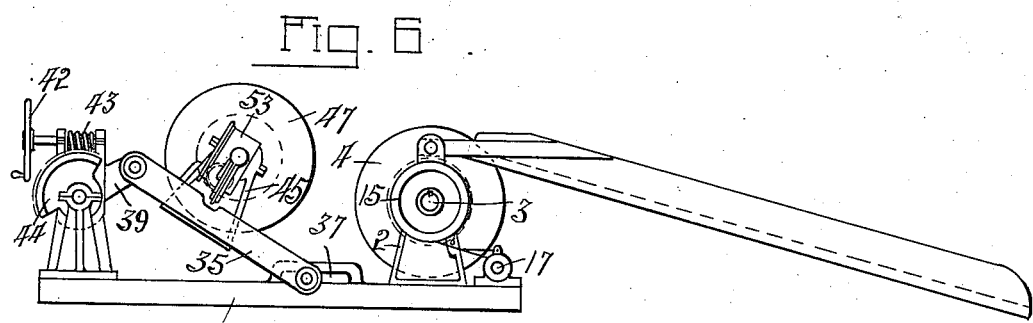
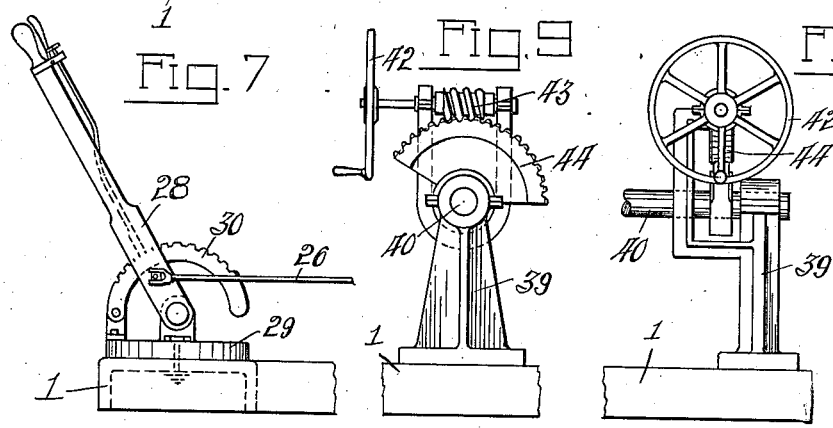 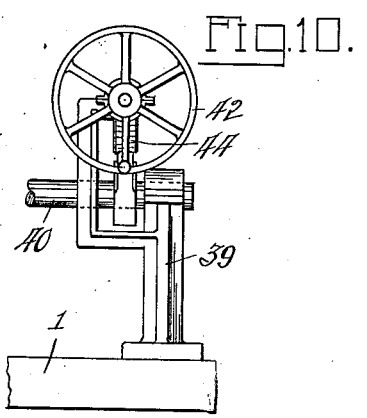
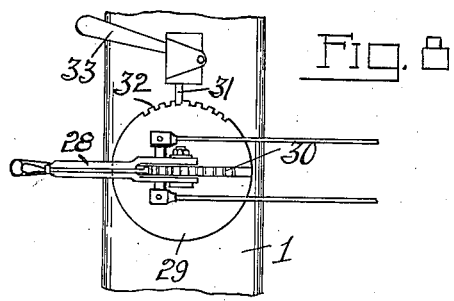
INVENTOR
Joseph T. Bishop,
By Owen Owen & Crampton,
His attys.

Apr. 24, 1923.

J. T. BISHOP 1,452,783

AUTOMOBILE TESTING APPARATUS

Filed Dec. 27, 1920

3 Sheets—Sheet 3

INVENTOR
Joseph T. Bishop,
By Owen Owen & Crampton,
His attys.

Patented Apr. 24, 1923.

1,452,783

UNITED STATES PATENT OFFICE.

JOSEPH T. BISHOP, OF TOLEDO, OHIO.

AUTOMOBILE TESTING APPARATUS.

Application filed December 27, 1920. Serial No. 433,249.

*To all whom it may concern:*

Be it known that I, JOSEPH T. BISHOP, a citizen of the United States, and a resident of Toledo, county of Lucas, and State of Ohio, have made an Invention Appertaining to Automobile Testing Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to testing apparatus, and particularly to such apparatus intended primarily for testing automobile brakes, and also for testing the differential connection of the driving means with the drive wheels of automobiles.

In the adjustment of automobile brakes it is a difficult matter to secure an even application thereof on both brake wheels, and it is commonly known that when skidding takes place upon the application of the brakes of an automobile, it is due to the brake on one side taking hold more firmly than on the other.

An object of my invention is the provision of an apparatus for use in connection with the brake wheels of an automobile, or the like, to easily, quickly and accurately determine if the application of the brakes on both wheels is uniform and, if not, the effect of the difference in the applied pressure.

A further object of the invention is the provision of simple means for testing the action and operation of automobile differentials to determine if both drive wheels are equally free to turn relative to the drive means.

Further objects and features of the invention will be apparent from the following detailed description thereof.

While the invention in its broader aspect is capable of embodiment in numerous forms, a preferred embodiment thereof is illustrated in the accompanying drawings, in which,—

Figure 11:
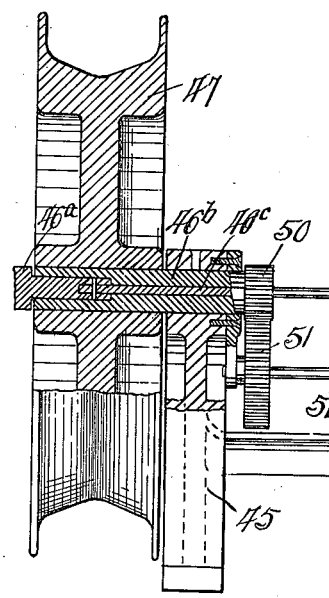
Figure 12:
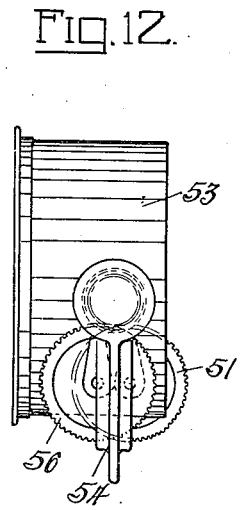
Figure 13:
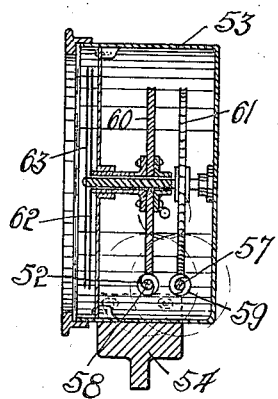

Figure 1 is a top plan view of an apparatus embodying the invention. Fig. 2 is an enlarged fragmentary detail of a part of the differential testing means of the apparatus. Figs. 3 and 4 are enlarged side and sectional views of the friction clutch means in connection with such mechanism. Fig. 5 is a side elevation of the apparatus in operative position with parts removed. Fig. 6 is a similar view thereof in automobile wheel receiving position with parts removed. Figs. 7 and 8 are enlarged side and top plan views of the control means for the differential testing mechanism. Figs. 9 and 10 are different enlarged elevations of the control means for the set of vertically shiftable wheel supporting rollers. Fig. 11 is an enlarged fragmentary detail of the brake testing gauge means. Fig. 12 is an outer end view thereof, and Fig. 13 is a central vertical section of the gauge.

Referring to the drawings, 1 designates a base frame having standards 2 rising, in the present instance, from the forward portion thereof and forming bearings for a shaft 3, which carries a pair of peripherally grooved wheels 4 properly spaced for engagement therewith of the respective brake and differential mechanism driven wheels of an automobile.

The shaft 3 comprises two axially aligned sections, which are connected by a friction clutch 5. The clutch which I have illustrated for this purpose comprises the opposed side members 6 and 7 (Fig. 4) fixed to the adjacent ends of the respective shaft sections to turn therewith, and each having annular wear collars 8 and 9 secured in coacting relation to their inner sides and secured thereto by bolts or screws 10. The member 6 has bolt stems 11 projecting therethrough and carrying a friction collar 12 at their inner ends between the members 6 and 7, with the outer edge of such collar entering a recess between the collar 9 and side member 7 whereby it may have frictional engagement with the side of the collar 9 adjacent to the member 7. The bolts 11 are encircled by coiled compression springs 13 mounted in sockets in the outer side of the plate 6 and the outer end thrusts of these springs are against tension nuts 14 on the outer ends of the bolts. It is thus evident that the frictional braking tension of the brake collar 12 on the coacting collar 9 may be regulated at will by an adjustment of the nuts 14 to effect a greater or less compression of the springs 11. Each section of the shaft 3 is provided at its outer end with a brake wheel, one being designated 15 and the other 16.

A rock shaft 17 is suitably journaled in bearings on the frame 1 in advance of the shaft 3 and parallel thereto, and has a rocker arm 18 at one end in connection with one end of a brake band 19, which encircles the brake-wheel 16 and has its other end anchored to the frame through the medium of a pin 20, or in any other suitable manner. The brake-wheel 15 is encircled by a brake-band 21, one end of which is anchored to the frame while its other end is connected to a rocker-arm 22 on a sleeve 23 mounted loosely on the shaft 17. The shaft 17 and sleeve 23 are provided in adjacent relation with rocker arms 24 and 25, respectively, having connecting rods 26 and 27 respectively projecting rearwardly therefrom and connected to opposite sides of a control lever 28, which pivotally rises from a bearing block 29 that is mounted on the rear portion of the frame 1 for horizontal turning movements. The lever 28 carries a hand latch for engagement with a notched segment 30 to retain the lever in adjusted position, and the bearing 29 is held in adjusted position relative to the frame by a latch member 31 engaging in any one of a plurality of peripheral notches 32 in the block. The movements of the member 31 are controlled by a hand lever 33.

It is evident that a rearward movement of the control lever 28 will communicate rocking movements to the shaft 17 and sleeve 23 to effect a tightening of the brake bands 19 and 21 on the respective brake wheels, and that a variance in the application of pressure on the different brake wheels may be effected by turning the block 29 one way or the other from the central position shown, which movement tends to release one brake band and apply the other, as is apparent. It is therefore evident that equal or different braking pressures may be applied to the different sections of the shaft 3 as desired.

Mounted on the frame 1 at the rear of each wheel 4 is a horizontally slidable and vertically tiltable frame 35, the forward end of each of which is provided with a cross rod 36 extending through and mounted for forward and rearward sliding movements in slots 37 provided in forwardly and rearwardly projecting cross-members 38 of the frame 1. The rear end of each frame 35 is pivotally connected to a respective pair of rocker-arms 39 depending from a rocker shaft 40, which is parallel to the shaft 3 and is journaled in bearings 41 rising from the rear end portion of the frame. It is thus evident that a rocking of the shaft 40 will effect a raising and lowering of the rear end portion of each frame 35, the longitudinal movement of the frame during such movements being permitted by reason of the sliding of the cross-rods 36 in the frame slots 37. The rocking movements of the shaft 40 are controlled from a hand wheel 42, the shaft of which carries a worm 43 in mesh with a worm-wheel segment 44 on the shaft 40.

Each elevating frame 35 has a forked bearing 45 rising therefrom, and a shaft 46 is journaled in, and connects the bearings of the two frames, whereby it is adapted to have vertical movements therewith. A peripherally grooved wheel 47 is fixed to the shaft 46 within the fork of each bearing 45 and in transverse alignment with one of the wheels 4 on the shaft 3.

When the frames 38 are raised the wheels 47 carried thereby are thrown upward and forward toward the front set of wheels 4 with the top surfaces of the rear wheels above the plane of the front wheels. The relative positioning of the wheels in this manner facilitates backing the rear drive wheels of an automobile into engagement therewith and prevents the full drop of the automobile wheels, which would otherwise be necessary as they pass into the space between the supporting wheels in contact therewith. Guide-ways 48 project downward and forward from the top surface of the front set of wheels 4, being pivoted, in the present instance, to the bearings 2 above the shaft 3, as shown at 49. When not in use the guides 45 may be thrown up over the top of the testing mechanism.

The shaft 46, which carries the wheels 47 is in two sections with one section 46$^a$ carrying the left hand wheel 47 and the other section 46$^b$ carrying the right hand wheel 47, as fragmentarily shown in Fig. 11. The shaft section 46$^b$ is hollow to permit a reduced end portion 46$^c$ of the shaft section 46$^a$ to have a bearing therein and to project therethrough beyond the end of the section 46$^b$. The section 46$^b$ is provided at its outer end without the bearing 45 with a gear 50 in mesh with a subjacent gear 51 on a shaft 52, which is journaled at one end in the bearing 45 and projects at its other end through and has a bearing in the wall of a gauge case 53. This case is carried by a bracket-arm 54 projecting outward from the adjacent bearing 45 and has its outer end upturned. The shaft section 46$^c$ projects through the case 43 and has a bearing at its outer end in the upturned portion of the bracket arm 54. It also carries at this end a gear 55 in mesh with a gear 56 on a subjacent shaft 57, which is journaled at one end in the upturned portion of the bracket arm and at its other end through and has a bearing in the adjacent wall of the gauge case 53. The shafts 52 and 57 have worms 58 and 59, respectively, within the case 53, the former in mesh with a worm wheel 60 and the latter in mesh with a worm wheel 61. These worm wheels have concentric shafts journaled within the case with one projecting through the other, and one shaft carrying an index finger 62 and the other an index finger 63 in exposed position and in register with a graduated dial face of the gauge. It is evident that a relative opposed turning of the brake testing wheels 47 will communicate a relative turning movement to the index fingers 62 and 63 through the intermediate gearing.

The use of my apparatus in testing the brakes and differential of an automobile is as follows:—The rear or drive wheels of an automobile are directed upward over the guideways 48 to the front set of supporting wheels 4, 4 and into engagement with the rear set of wheels 47, which are then in the raised position shown in Fig. 6. The wheels 47 are then lowered to the operative position shown in Fig. 5 by a turning of the hand wheel 42, the engine, if not already running, is then started and the brakes applied. If the brakes on both wheels do not take hold evenly, the fact will be indicated by a movement of one indicator finger 63 with respect to the other. The brakes may then be adjusted until both indicator fingers stand at rest, when the brakes are applied. To test the differential, either or both of the differential testing brake bands 19 and 21 may be applied while the automobile wheels are running. To uniformly apply both brakes 19 and 21, the control lever 28 is drawn rearward when in its central position, as shown in Figs. 1, 7 and 8, and if there is a relative turning of the two frictionally connected sections of the shaft 3, it will be known that the drive from the differential to one drive wheel is more free than the drive to the other drive wheel. An unequal braking action may also be applied to either wheel 4 by shifting the lever 28 with the block 29 in either direction in central position and then drawing the wheel rearward to apply the brake. It is important in some cases to have this uneven application of the brakes to the wheels 4, 4 for certain testing purposes.

I wish it understood that my invention is not limited to any specific construction, arrangement, or form of the parts, as it is capable of numerous modifications and changes without departing from the spirit of the claims.

Having thus described my invention, what I claim as new and desire to secure by Letters Patent, is,—

1. An apparatus of the class described having relatively rotatable members for engaging the different brake wheels of an automobile, and means actuated by a relative movement of the members to indicate any relative movement thereof.

2. An apparatus of the class described having relatively rotatable members for engagement with the different brake wheels of an automobile to be rotated thereby, and a gauge means having index fingers connected to the respective rotatable members and operable to indicate any relative movement of the members.

3. In an apparatus of the class described, two axially aligned shafts, a rotatable member fixed to each shaft in position for the different members to be engaged and driven by different brake wheels of an automobile, and means connected to said shafts and operable by relative turning movements thereof to indicate such relative movements.

4. In an apparatus of the class described, two sets of wheels cooperating to rotatably support the brake wheels of an automobile, the wheels of each set being capable of relative rotation, and means connected to the wheels of one set and operable to indicate any relative rotation thereof.

5. In an apparatus of the class described, two sets of wheels spaced to cooperate to support the brake wheels of an automobile, means carrying one set of wheels for movement toward and away from the other set, the wheels of each set being capable of relative rotation, and means connected to the wheels of one set and operable to indicate a relative rotation thereof.

6. In an apparatus of the class described, a frame, a set of relatively rotatable wheels carried in axially spaced relation by the frame, a second set of relatively rotatable wheels adapted to cooperate with the wheels of the first set to support respective brake wheels of an automobile, means carrying the second set of wheels for horizontal and vertical adjustment toward and away from the other set, and means connected to the wheels of the second set and operable to indicate any relative movement of the wheels of such set.

7. In an apparatus of the class described, a pair of rotatable members for driving engagement with the respective differentially connected drive wheels of an automobile, and friction clutch means between the rotatable members operable to apply a predetermined resistance to a relative rotation of the members.

8. In an apparatus of the class described, relatively rotatable members for engagement with the differentially connected drive wheels of an automobile to be driven thereby, friction clutch means connecting said members, and means for applying a braking action to the members.

9. In an apparatus of the class described, independently operable means adapted to be driven by contact with the respective differentially connected drive wheels of an automobile, and including respectively relatively rotatable members, and braking means operable to apply different pressures on the respective members to resist rotation thereof.

10. In an apparatus of the class described, independently operable means adapted to be driven by contact with the respective differentially connected drive wheels of an automobile, and including respectively relatively rotatable members, and braking means operable to apply either equal or unequal pressures on the respective members to resist rotation thereof.

11. In an apparatus of the class described, a shaft having frictionally connected aligned sections, a driven wheel and a brake-wheel carried by each section, the driven wheels being adapted to have engagement with the respective differentially connected drive wheels of an automobile to be driven thereby, two rock shafts each having a rocker arm a brake band connecting each brake-wheel with an arm of a respective rock shaft, and means operable to rock both shafts in unison to produce an equal application of the brakes or to produce an unequal application of the brakes.

12. In an apparatus of the class described, two sets of wheels cooperating to rotatably support the brake wheels of an automobile, the wheels of each set being capable of relative rotation, means connected to the wheels of one set and operable to indicate any relative rotation thereof, and clutch means for applying a predetermined resistance to a relative rotation of the wheels of the other set.

13. In an apparatus of the class described, means for rotatably supporting the brake wheels of an automobile for relative rotation, means for applying a predetermined resistance to a relative rotation of the wheels, and means operable to indicate any relative rotation of the wheels.

14. In an apparatus of the class described, means driven by the brake wheels of an automobile for relative rotation, means operated by the first means to indicate any relative rotation of the wheels, and means acting on the first means to apply a predetermined resistance to a relative rotation of the brake wheels.

15. In an apparatus of the class described, means driven by the brake wheels of an automobile for relative rotation, means operated by the first means to indicate any relative rotation of the wheels, means acting on the first means to apply a predetermined resistance to a relative rotation of the brake wheels, and means acting on and through the first means to cause it to apply a different braking action on the different wheels to resist a rotation thereof.

16. In an apparatus of the class described, means driven by the brake wheels of an automobile for relative rotation, means operated by the first means to indicate any relative rotation of the wheels, means acting on the first means to apply a predetermined resistance to a relative rotation of the brake wheels, and means operable through the first means to apply equal or unequal braking pressure on the different wheels to resist a rotation thereof.

In testimony whereof I have hereunto signed my name to this specification.

JOSEPH T. BISHOP.